(12) United States Patent  
Coates et al.

(10) Patent No.: US 6,680,767 B2  
(45) Date of Patent: Jan. 20, 2004

(54) METHOD OF FORMING A LIQUID CRYSTAL POLYMER LAYER WITHOUT SUPPORT SUBSTRATE

(75) Inventors: David Coates, Dorset (GB); Suzanne Corrie, Oxon (GB); Javed Sabir, Middlesex (GB)

(73) Assignee: Central Research Laboratories Limited, Middlesex (GB)

(*) Notice: Subject to any disclaimer, the term of this patent is extended or adjusted under 35 U.S.C. 154(b) by 112 days.

(21) Appl. No.: 10/115,447

(22) Filed: Apr. 3, 2002

(65) Prior Publication Data

US 2002/0167639 A1 Nov. 14, 2002

(51) Int. Cl.[7] ............... G02F 1/1337; G02F 1/1335; G02F 1/13; C09K 19/00
(52) U.S. Cl. .............. 349/123; 349/117; 349/187; 428/1
(58) Field of Search ................ 349/117, 123, 349/187; 428/1; 438/30

(56) References Cited

U.S. PATENT DOCUMENTS 5,681,624 A * 10/1997 Moriya .................. 428/1
5,958,596 A * 9/1999 Claussen et al. ........... 428/426
6,166,799 A * 12/2000 Kameyama et al. ....... 349/185
6,320,634 B1 * 11/2001 Winker et al. ............ 349/117
2002/0060761 A1 * 5/2002 Scheuble et al. ........... 349/96

* cited by examiner

Primary Examiner—Toan Ton
Assistant Examiner—Mike Q.
(74) Attorney, Agent, or Firm—Martin Fleit; Paul D. Bianco; Fleit Kain Gibbons Gutman Bongini & Bianco P.L.

(57) ABSTRACT

A method of forming a liquid crystal polymer layer includes: coating a substrate with a release layer; coating the release layer with an alignment layer capable of aligning a liquid crystal polymer layer; coating the alignment layer with a layer of a liquid crystal polymer material, thereby forming a liquid crystal polymer layer in which the molecules have a predetermined orientation; solidifying the layer of liquid crystal polymer; and dissolving the release layer in a liquid which does not harm the solidified liquid crystal polymer layer to form a self supporting film. The release layer and alignment layer can be combined into a single layer, such as for example a layer of polyvinyl alcohol which may be dissolved in water. Thicker or multi-layer films can be fabricated by using the first solidified layer as an alignment layer for a subsequently deposited liquid crystal polymer layer.

20 Claims, 1 Drawing Sheet

METHOD OF FORMING A LIQUID CRYSTAL POLYMER LAYER WITHOUT SUPPORT SUBSTRATE

FIELD OF THE INVENTION

The present invention relates to a method of forming a liquid crystal polymer layer in which the molecules have a predetermined orientation. It relates particularly, though not exclusively, to methods of forming unsupported films less than 6 microns thick for use as retardation plates, for example in fiber optic systems.

BACKGROUND OF THE INVENTION

The polarization state of light can be varied by passing it through a retardation plate. For example, when linearly polarized electromagnetic radiation having a wavelength of 1550 nm is passed through a retardation plate having a retardation of 775 nm it is converted to circularly polarized electromagnetic radiation. The process also works in reverse, so that when circularly polarized electromagnetic radiation having a wavelength of 1550 nm is passed through a retardation plate having a retardation of 775 nm, linearly polarized electromagnetic radiation is produced. Such a plate is called a half wave plate. Such plates are often made from stretched polycarbonate or polyvinyl alcohol (PVA) films. However, due to the low birefringence of such films they have to be of the order of 100 to 300 microns thick, depending upon the wavelength of the electromagnetic radiation used.

For some applications, for example for fiber optic applications in the telecomm industry, very thin films are required, which can be made from aligned liquid crystal polymers. These films can be made by traditional coating techniques on glass substrates, but when this is done, the film often adheres strongly to the substrate, such that when removed, the liquid crystal polymer film stretches, changing its retardation. Thus they do not readily release from the substrate and cannot be mechanically removed due to their fragile nature (often only a few microns thick). In some applications, the transmission losses associated with inserting the glass substrate (which is typically greater than 50 microns in thickness) between optical fibers make the use of films supported by the substrate unattractive.

SUMMARY OF THE INVENTION

The present invention relates to a method of forming a liquid crystal polymer layer. The method includes the steps of: coating a substrate with a release layer; coating the release layer with an alignment layer capable of aligning a liquid crystal polymer layer; coating the alignment layer with a layer of a liquid crystal polymer material, thereby forming a liquid crystal polymer layer in which the molecules have a predetermined orientation; solidifying the layer of liquid crystal polymer; and dissolving the release layer in a liquid which does not harm the solidified liquid crystal polymer layer to form a self supporting film. The release layer and alignment layer can be combined into a single layer, such as for example a layer of polyvinyl alcohol which may be dissolved in water. Thicker or multi-layer films can be fabricated by using the first solidified layer as an alignment layer for a subsequently deposited liquid crystal polymer layer.

The present invention also relates to a retardation plate made using the claimed method.

BRIEF DESCRIPTION OF THE DRAWINGS

Embodiments of the invention will now be described, by way of example only, with reference to the accompanying schematic drawings, in which.

DETAILED DESCRIPTION OF THE INVENTION

This invention relates to a method in which a thin liquid crystal polymer film is formed on a substrate, and then released from the substrate as a free-standing film. Because such a film is fragile, it can (if desired) be carried by a more substantial carrier film to give physical rigidity and strength. Both free standing liquid crystal polymer films and liquid crystal polymer films bound to a flexible carrier film which adds some rigidity can be fabricated using the method of the present invention.

Figure 1:
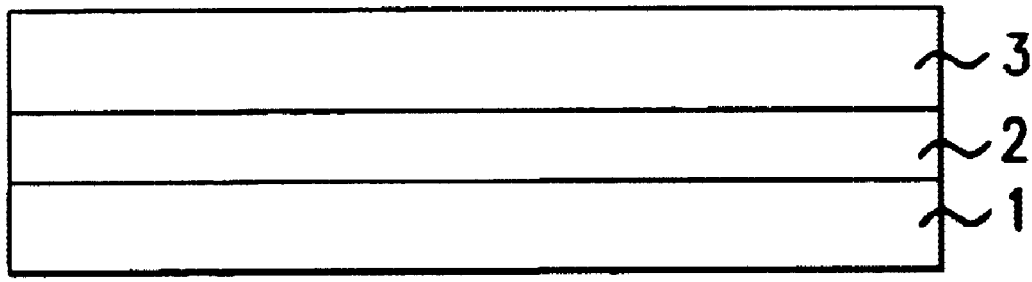
FIG. 1 shows, in cross-section, a film made using a first embodiment of a method according to the invention.

A cross sectional view of a film during manufacture using a method according to the present invention is shown in FIG. 1. A substrate (1) of glass or other rigid material is coated with a release layer (2). In the present embodiment, this layer comprises a polymer that dissolves in water, although any material which dissolves in a liquid that does not dissolve or attack the liquid crystal polymer layer subsequently formed can be used (for example a metallic or inorganic or organic material). In the present example, polyvinyl alcohol (PVA) is used as the polymer release layer, which dissolves in water.

After the PVA release layer is formed, it is subjected to unidirectional rubbing. The PVA layer then acts as an aligning layer for a subsequent coating of a liquid crystal polymer. The liquid crystal polymer (LCP) in the present embodiment is a reactive liquid crystal, which is polymerized to form a solidified, aligned liquid crystal polymer film (3) by UV curing.

The process is now described in more detail. The glass substrate (1) (1.1 mm thick and 2.5 cm square), is spin-coated with a 1% solution of polyvinyl alcohol (MWt 15,000) in water. Optionally, 0.2% by weight (relative to the PVA) of a surface-active agent such as Fluorad 430 can be added to aid wetting of the PVA to the glass. Spin speed was 2000 rpm for 1 minute. The polymer film was dried at 90° C. for 20 minutes. This yields a PVA film (2) about 1 micron thick, but the film thickness is not critical. Higher molecular weight PVA can be used, but it is difficult to dissolve, and more difficult to get alignment of the liquid crystal on it (more vigorous rubbing is needed). Thus 15,000 MWt was chosen.

The PVA coating is then rubbed in one direction 20 times with a velvet cloth to cause microgrooves in the PVA surface and/or alignment of the surface polymer chains, to align a subsequent coating of reactive liquid crystal. A suitable reactive nematic liquid crystal (such as for example RMM34 from Merck UK) was dissolved at 50% concentration in cyclopentanone, and filtered through a 0.2 micron filter. This solution was spin coated onto the glass/PVA substrate at 3000 rpm, to give a uniform coating that was dried in an oven at 60° C. for 5 min. When viewed between crossed polarizers, the nematic liquid crystal film was seen to be homogeneously aligned on the rubbed PVA. The liquid crystal film was cured using UV light having an intensity of between 0.5 and 3 mW cm-2 for 15 min in a nitrogen atmosphere to give an aligned liquid crystal polymer film (3) showing the same alignment as the reactive liquid crystal.

PVA is a good choice for a release layer, as it does not dissolve in organic solvents used in the next coating steps. If it is heated too much (say 200° C. for 1 hr), the PVA becomes insoluble in water. Thus one cannot put a high temperature cure polymer on top of it. For example, polyimide, often used to align liquid crystals, requires a high temperature heating step (typical at least 1 hr at 200° C.) and thus if used as the resilient carrier film cannot be released from the glass if a PVA/water release system is used.

As an alternative to a reactive liquid crystal, a side chain LCP can be used. In this case, the UV curing step is not necessary. Such films are less stable to heat because they are not cross-linked. However they undergo no shrinkage and are less susceptible to curling. Side chain LCPs are usually less soluble in solvents used for spin coating, resulting in thin films having a correspondingly lower retardation than those produced with reactive liquid crystal materials.

Other layers of material can be subsequently coated onto the solidified LCP film prior to release, if required, to give further retardation values, or provide protection or passivation, or to give additional optical effects (such as absorbing films).

The films are easily released by soaking the glass substrate and stack of films in running water for about 30–60 min after which the film can be teased from the glass using tweezers because the release layer is dissolved by the water. After removal, the film is dried in an oven for 30 min at 40° C.

The retardation of the liquid crystal polymer films made using the above method was measured using a Senarmount compensator at 550 nm (using a suitable filter).

The retardation of this film depends on the film thickness d and the birefringence of the liquid crystal polymer according to the well known equation:

Retardation (nm)=film thickness (in nanometers)×birefringence
(R=d.Δn)

The film showed a very slight curl after release, and its retardation was the same as it had been on the glass (namely 546 nm), showing that no stretching of the film had taken place.

Figure 2:
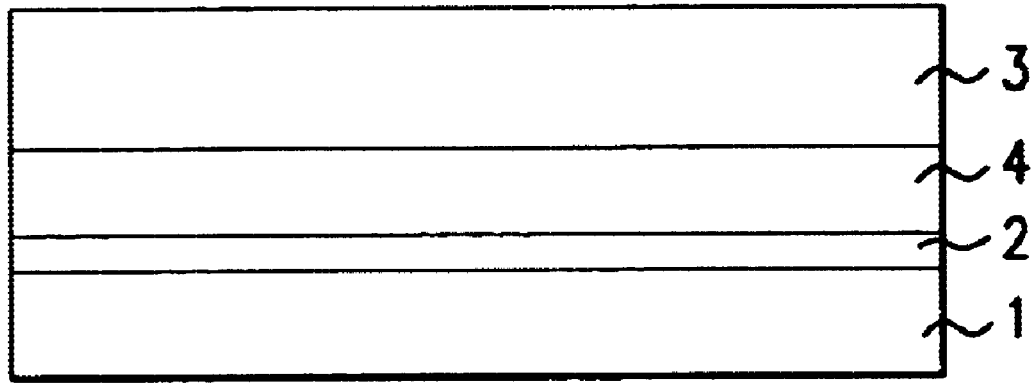
FIG. 2 shows, in cross-section, a film made using a further embodiment of a method according to the invention.

FIG. 2 illustrates a film made using a second embodiment of a method according to the invention. In this embodiment, a further layer (4) is coated onto the PVA to provide a combined carrier and alignment film for subsequent liquid crystal polymer films. In this embodiment, the carrier film (4) must be treated to provide alignment to the liquid crystal polymer layers. There is thus no need to rub the PVA release layer in this case to provide alignment.

The PVA film prepared as described previously is spin-coated with a prepolymer (or curable oligomer formulation) that is selected for its transparency to the light that the retardation film will be subjected to and its durability. Other desirable qualities of this film are high solvent and pollutant resistance, zero birefringence, and flexibility. In the present example, a photo-curable polyurethane based pre-polymer formulation was selected (Ebecryl 264 from Radcure Ltd). A suitable photo-initiator selected for its non-yellowing properties and fast cure (such as for example Irgacure 184 (from Ciba Giegy) is added. Other constituents such as reactive diluents, cross-linking agents, monoreactive acrylates, wetting agents and leveling agents can optionally be added to improve the mechanical or alignment properties of the reactive liquid crystal.

A 50% solution of Ebecryl 264 in cyclopentanone was coated onto the PVA film on glass at 500 rpm for 10 seconds then at 2000 rpm for 30 seconds. After allowing the solvent to evaporate (20 min at 40° C.) the film was UV cured in nitrogen for 15 min to give a resilient tough, clear film 5.8 microns thick (4).

This film was rubbed 40 times in one direction with a cotton cloth—it is much more resistant to rubbing than PVA. The rubbed polyurethane film was then spin coated and cured as previously described with RMM34.

The film on polyurethane could be handled easily without it tearing or stretching. The liquid crystal polymer adhered well to the polyurethane support film. The liquid crystal polymer alone is very fragile, and easily folds up on itself.

Although a specific UV curable material was used in the above example to form the carrier layer, a wide range of other materials can be used, for example oligomeric polyesters, polyurethanes, and polyacrylates. As an alternative, a heat cured system such as an epoxy/amide pre-polymer system can be used instead of the UV cured system described. However, the cure time is typically longer than with UV cured systems. Polyurethane, polyester, and polyacrylate carrier films can be used. In principle any curable system can be used—it should preferably be cross-linked, otherwise the solvent used to coat the liquid crystal polymer will attack it and degrade its alignment. If such a heat cured material is used, the curing has to be carried out at a low temperature if a PVA release layer is employed to avoid making it insoluble in water.

Alternatives to the RMM34 material from Merck used in the examples above can be used. For example, the nematic diacrylate reactive liquid crystal LCP 2224 from BASF, but this material does not align as well. Another alternative is LCP CB 483 available from Vantico Ltd. The cross linking of the reactive liquid crystals can be varied. Low cross-linking gives LCP films which are more flexible, and which adhere well to the carrier film, but having lower heat and solvent stability. The BASF material is highly cross linked, whereas the Merck material is less cross-linked.

It is also possible to spin coat a side chain liquid crystal polymer such as PLC-7023 from Asahi Denka KK, Japan. This material does not need curing, but does need to be annealed for longer after coating to allow it to align due to it being a polymer already and thus more viscous. As it is not cross-linked after coating, there is no shrinkage due to curing (i.e. no curling), but the film is less resistant to high temperatures and solvent attack.

It is possible to make thicker or thinner films by changing the concentration of the RMM34, or by changing the spin speed. The above film is about 3 microns thick. It is possible to coat one liquid crystal polymer onto another, as they self align. Thus multiple film depositions can be used to give thicker films (for example up to 20 microns thick), with correspondingly higher retardation.

While various descriptions of the present invention are described above, it should be understood that the various features could be used singly or in any combination thereof. Therefore, this invention is not to be limited to only the specifically preferred embodiments depicted herein.

Further, it should be understood that variations and modifications within the spirit and scope of the invention might occur to those skilled in the art to which the invention pertains. For example, although in the above examples a PVA release layer was used, other release layers such as for example other organic or inorganic or metal layers can be employed. With alternative release layers, the method of dissolving the release film is similar, but different liquids, such as acids or other solvents, may be required.

Accordingly, all expedient modifications readily attainable by one versed in the art from the disclosure set forth herein that are within the scope and spirit of the present invention are to be included as further embodiments of the present invention. The scope of the present invention is accordingly defined as set forth in the appended claims.

What is claimed is:

1. A method of forming a liquid crystal polymer layer, the method comprising:
   a) coating a substrate with a release layer which dissolves in a first liquid;
   b) coating the release layer with an alignment layer capable of aligning the molecules of a liquid crystal polymer layer in a predetermined direction;
   c) coating the alignment layer with a layer of a liquid crystal polymer material which does not dissolve in said first liquid when solidified, thereby forming a liquid crystal polymer layer in which the molecules have a predetermined orientation;
   d) solidifying said layer of liquid crystal polymer; and
   e) dissolving the release layer in the first liquid and removing the substrate.

2. A method as claimed in claim 1 in which the solidified layer of liquid crystal polymer acts as an alignment layer for a subsequent layer of liquid crystal polymer deposited thereon, the subsequent layer being solidified prior to step e).

3. A method as claimed in claim 2 in which each layer of liquid crystal polymer is less than 6 microns thick.

4. A method as claimed in claim 1 in which the release layer consists of polyvinyl alcohol.

5. A method as claimed in claim 4 in which the first liquid is water.

6. A method as claimed in claim 1 in which the layer of liquid crystal polymer is less than 20 micron thick.

7. A method as claimed in claim 1 in which the layer of liquid crystal polymer is less than 6 micron thick.

8. A method as claimed in claim 1 in which the layer of liquid crystal polymer is less than 1 micron thick.

9. A method as claimed in claim 1 in which the release layer and the alignment layer are combined in a single layer, said single layer being dissolved by said first liquid.

10. A method as claimed in claim 9 in which the solidified layer of liquid crystal polymer acts as an alignment layer for a subsequent layer of liquid crystal polymer deposited thereon, the subsequent layer being solidified prior to step e).

11. A method as claimed in claim 10 in which each layer of liquid crystal polymer is less than 6 microns thick.

12. A method as claimed in claim 9 in which the release layer consists of polyvinyl alcohol.

13. A method as claimed in claim 12 in which the first liquid is water.

14. A method as claimed in claim 9 in which the layer of liquid crystal polymer is less than 20 micron thick.

15. A retardation plate comprising a liquid crystal polymer film made using a method as claimed in claim 1.

16. A method of forming a liquid crystal polymer layer, the method consisting of:
   a) coating a substrate with a release layer which dissolves in a first liquid;
   b) coating the release layer with an alignment layer capable of aligning the molecules of a liquid crystal polymer layer in a predetermined direction;
   c) coating the alignment layer with a layer of a liquid crystal polymer material which does not dissolve in said first liquid when solidified, thereby forming a liquid crystal polymer layer in which the molecules have a predetermined orientation;
   d) solidifying said layer of liquid crystal polymer; and
   e) dissolving the release layer in the first liquid and removing the substrate.

17. A method as claimed in claim 16 in which the solidified layer of liquid crystal polymer acts as an alignment layer for a subsequent layer of liquid crystal polymer deposited thereon, the subsequent layer being solidified prior to step e).

18. A method as claimed in claim 17 in which each layer of liquid crystal polymer is less than 6 microns thick.

19. A method as claimed in claim 16 in which the release layer consists of polyvinyl alcohol.

20. A method as claimed in claim 19 in which the first liquid is water.

* * * * *